United States Patent
Kotani et al.

(10) Patent No.: US 6,173,390 B1
(45) Date of Patent: *Jan. 9, 2001

(54) STORAGE MEDIUM DRIVING DEVICE, STORAGE MEDIUM AND DATA PROTECTING METHOD

(75) Inventors: Seigo Kotani; Naoya Torii; Jun Kamada, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/943,845

(22) Filed: Oct. 3, 1997

(30) Foreign Application Priority Data

Apr. 9, 1997 (JP) .................................. 9-091132

(51) Int. Cl.[7] .................................................. G06F 15/00
(52) U.S. Cl. .............................................................. 712/37
(58) Field of Search ........................... 380/3, 4; 713/200; 712/37

(56) References Cited

U.S. PATENT DOCUMENTS

| 5,392,351 |   | 2/1995 | Hasebe et al. | 380/4 |
| 5,555,304 |   | 9/1996 | Hasebe et al. | 380/4 |
| 5,608,910 | * | 3/1997 | Shimakura | 395/670 |
| 5,657,301 | * | 8/1997 | Yoshikawa et al. | 369/30 |
| 5,805,800 | * | 9/1998 | Kotani et al. | 395/186 |

* cited by examiner

*Primary Examiner*—John A. Follansbee
(74) *Attorney, Agent, or Firm*—Greer, Burns & Crain, Ltd.

(57) ABSTRACT

A data protecting method wherein a resident control program which is stored as to be resident in a storage medium driving device judges on the basis of instruction from an executing device for executing a specified process, whether a control program for executing the process is incorporated or not therein, searches the control program from a set storage medium when the result of judgment is NO, reads in the searched control program, and incorporates the read-in control program therein. A storage medium driving device which stores this resident control program as to be resident, and a storage medium which is driven by this device.

18 Claims, 4 Drawing Sheets

STORAGE MEDIUM DRIVING DEVICE, STORAGE MEDIUM AND DATA PROTECTING METHOD

BACKGROUND OF THE INVENTION

The present invention relates to a storage medium driving device which ensures the security of the program stored in the medium against unauthorized use or other illegal copying, and also to a storage medium and a method capable of ensuring the program security, wherein the storage medium is a detachable medium such as a digital video disk, CD-ROM, or magneto-optical disk.

There are various methods known in the art for ensuring the security of programs and data stored in media. One of them is to devise such a program as to guard against unauthorized use, and another is to devise an executing program of a processor like a personal computer so as to be safe from illegal access.

However, if the personal computer is unconditionally allowed to fetch the program stored in the medium, it is difficult to protect the program from illegal copying, and therefore, it is preferable to limit the ability to fetch the program to the medium driving device.

The level of security differs program by program, which means that each storage medium must be provided with its own level of security. To achieve this result, firmware is required for controlling a storage medium driving device. However, the firmware must have a sufficient capacity for accommodating a built-in memory, thereby increasing the production costs of the storage medium driving devices.

BRIEF SUMMARY OF THE INVENTION

The present invention has been devised to solve the above problems. The purpose of the present invention is to provide a storage medium driving device, a storage medium and a data protection method thereof, which enable execution of various types of security for record information recorded in a detachable storage medium without the necessity of raising the production cost.

The present invention relates to a data protecting method and a storage medium driving device which realize protection of record information recorded in a detachable storage medium, and a resident control program stored in the storage medium driving device which performs the following steps: on the basis of instructions from an executing device for executing a specified process, it is judged whether a control program for executing the process is incorporated or not. If it is judged NO, a control program is searched from a mounted storage medium, read in, and is incorporated. Consequently, it is enabled for a variation in security without the necessity of a large internal memory or a rise in production cost.

Further, in the present invention, if the control a program is encrypted, the resident control program searches for the encrypted control program, reads it in, decrypts it, and incorporates it. Since the read-in control program is incorporated in a decrypted manner, a process which can not be executed by other storage medium driving devices can be executed.

Further, in the present invention, the resident control program reads in information from a storage medium, which is peculiar to each of storage media, and decrypts control programs by using the peculiar read-in information. Since the read-in control programs are incorporated after decryption by using the peculiar information by the storage medium, a process which can not be executed by other storage medium driving devices can be executed.

Further, in the present invention, the resident control program is interlocked with the incorporated control program. Moreover, it is judged by the resident control program whether the read-in control program can be interlocked therewith, and if it is judged YES, the control program is incorporated. For example, it is judged whether the resident control program and the control program read-in by a reading-in means can be interlocked with each other, or whether the resident control program and the read-in control program can be interlocked with each other if specified conditions are met such as that no unnecessary program is appended to the read-in control program, and so on. Thus, since no control program that is unable to be interlocked with the resident control program is incorporated, no malfunctions and thus no errors are likely to occur.

Further, in the present invention, it is judged by the resident control program whether the incorporated control program is equal to the read-in control program, and if it is judged YES (the programs are equal), the read-in control program is not incorporated. Thus, unnecessary actions are avoided.

Further, in the present invention, no program other than the resident control program is allowed to read in any information peculiar to each storage medium. It is alternately not allowed to any program other than the resident control program to read in any control program from the storage medium. Thus, it is impossible for a process executing device such as a personal computer to read in a control program from a storage medium, to control the storage medium driving device and to include the contents thereof.

Further, in the present invention, the resident control program reads in encrypted information kept within the control program, and it is judged on the basis of the read-in encrypted information whether this control program has been tampered. If it is judged NO (the control program has not been tampered with), the control program is read-in. In this way, if the control program stored in the storage medium has been tampered with, it is not used, thus it can not be used in a manner other than it is supposed to.

A storage medium according to the present invention stores peculiar information therein, and it is driven by the afore-mentioned device which is able to read in information peculiar to each medium. Since the storage medium stores control programs in an encrypted manner, no process can be executed by a storage medium driving device other than a specified one.

Further, the storage medium according to the present invention keeps within the stored control program encrypted information for judging whether this control program has been tampered with, and it is driven by the afore-mentioned device which judges on the basis of encrypted information kept in the control program whether the control program has been tampered with. In this storage medium, if the stored control program has been tampered with, this control program will not be used, thus it can not be used in a manner other than it is supposed to.

The above and further objects and features of the invention will more fully be apparent from the following detailed description with accompanying drawings.

DETAILED DESCRIPTION OF THE INVENTION

The present invention will be described in details with reference to the drawings showing an embodiment of the invention.

Figure 1:
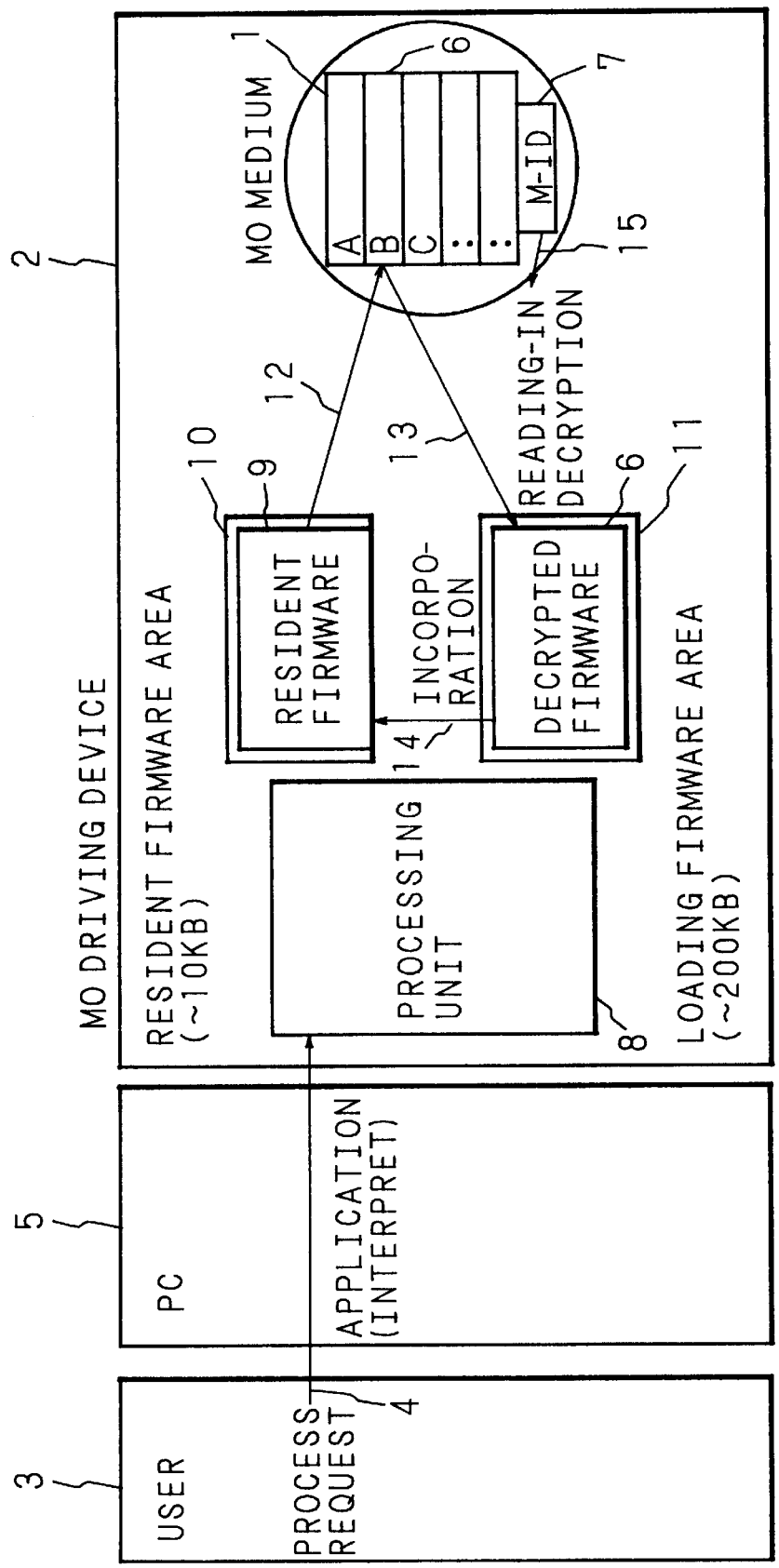
FIG. 1 is a block diagram showing a constitution of a storage medium driving device, storage medium and a data protecting method according to an embodiment of the present invention.

FIG. 1 is a block diagram showing constitution of a storage medium driving device, storage medium, and a data protecting method according to an embodiment of the present invention. In this constitution, if a process request 4 is made by a user 3 to a personal computer 5 which is an executing device for executing processes such as play back of purchased software (movie, and so on), stored in an MO medium or reading in a program stored in an MO medium, the personal computer 5 interprets these process requests 4 using its own application program, and sends the interpreted process requests 4 to a processing unit 8 of an MO driving device 2.

If the process request 4 is transmitted to the processing unit 8, it is judged by using a resident firmware 9 (resident control program) which is kept permanently in a resident firmware area 10 of the MO driving device 2, whether the resident firmware 9 incorporates a firmware (control program) for executing this process. If it is judged NO (the firmware is not incorporated), an installed MO medium 1 is driven as to execute a search 12 for finding a firmware 6 for executing the process out of encrypted firmware A, B, C stored in the MO medium 1.

By using the resident firmware 9, the processing unit 8 performs reading-in 15 of a media ID symbol 7 (information peculiar to storage medium) which is information peculiar to the MO medium 1. By using this media ID symbol 7, decryption 13 of firmware 6 is executed, and the decrypted firmware 6 is written into a loading firmware area 11.

By using the resident firmware 9, the processing unit 8 performs incorporation 14 of the decrypted firmware 6 from the loading firmware area 11 to the resident firmware 9 within the resident firmware area 10, and the operating environment of the MO driving device 2 for executing the process request 4 is prepared.

As such, the MO driving device 2 performs the requested process by using contents kept in areas other than those of firmware A, B, C of the MO medium 1.

Figure 2:
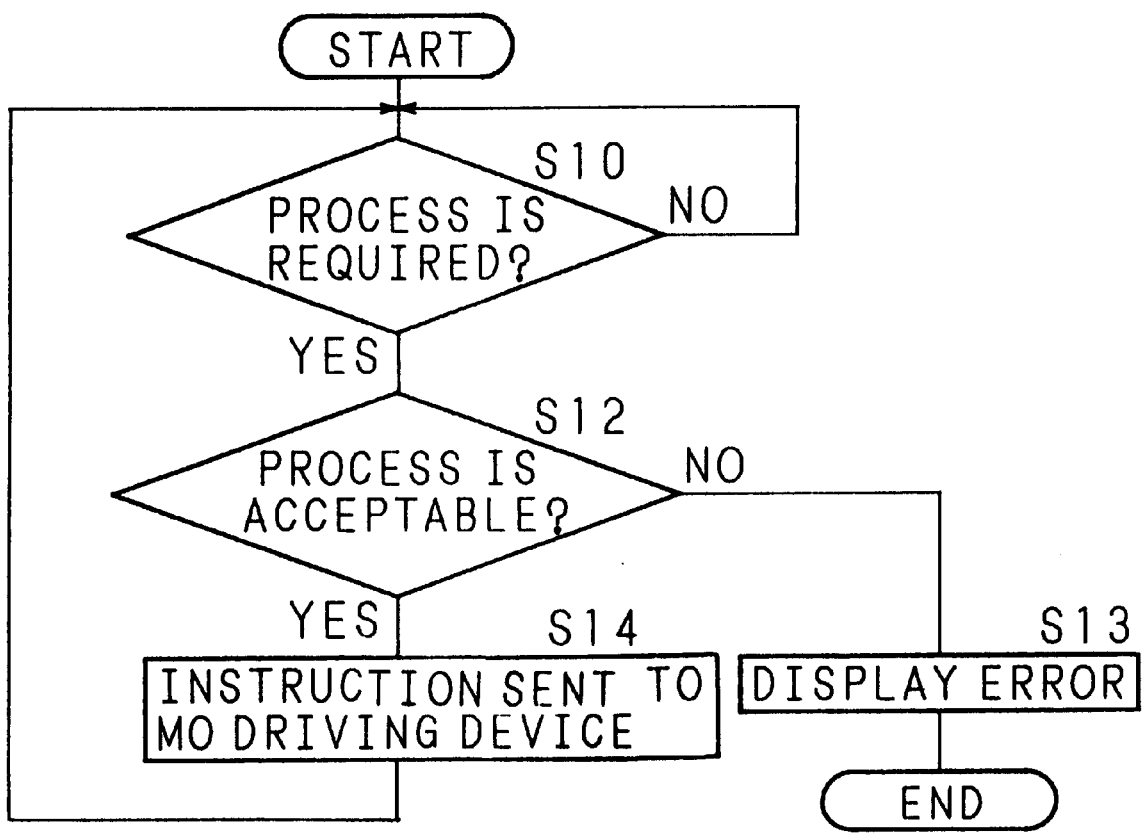
FIG. 2 is a flowchart showing an operation of a personal computer controlling an MO driving device.
Figure 3:
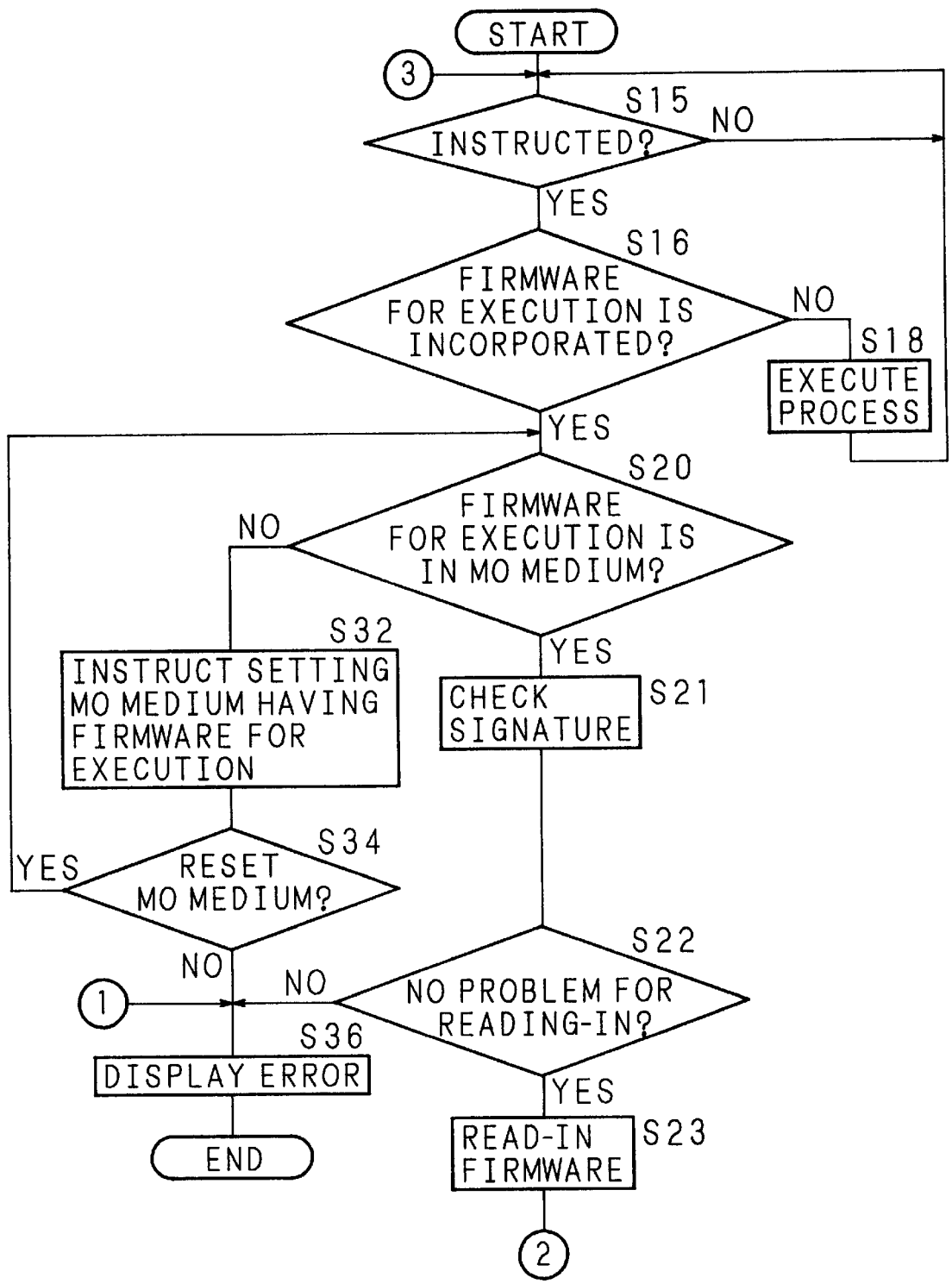
FIG. 3 is a flowchart showing an operation of the MO driving device.
Figure 4:
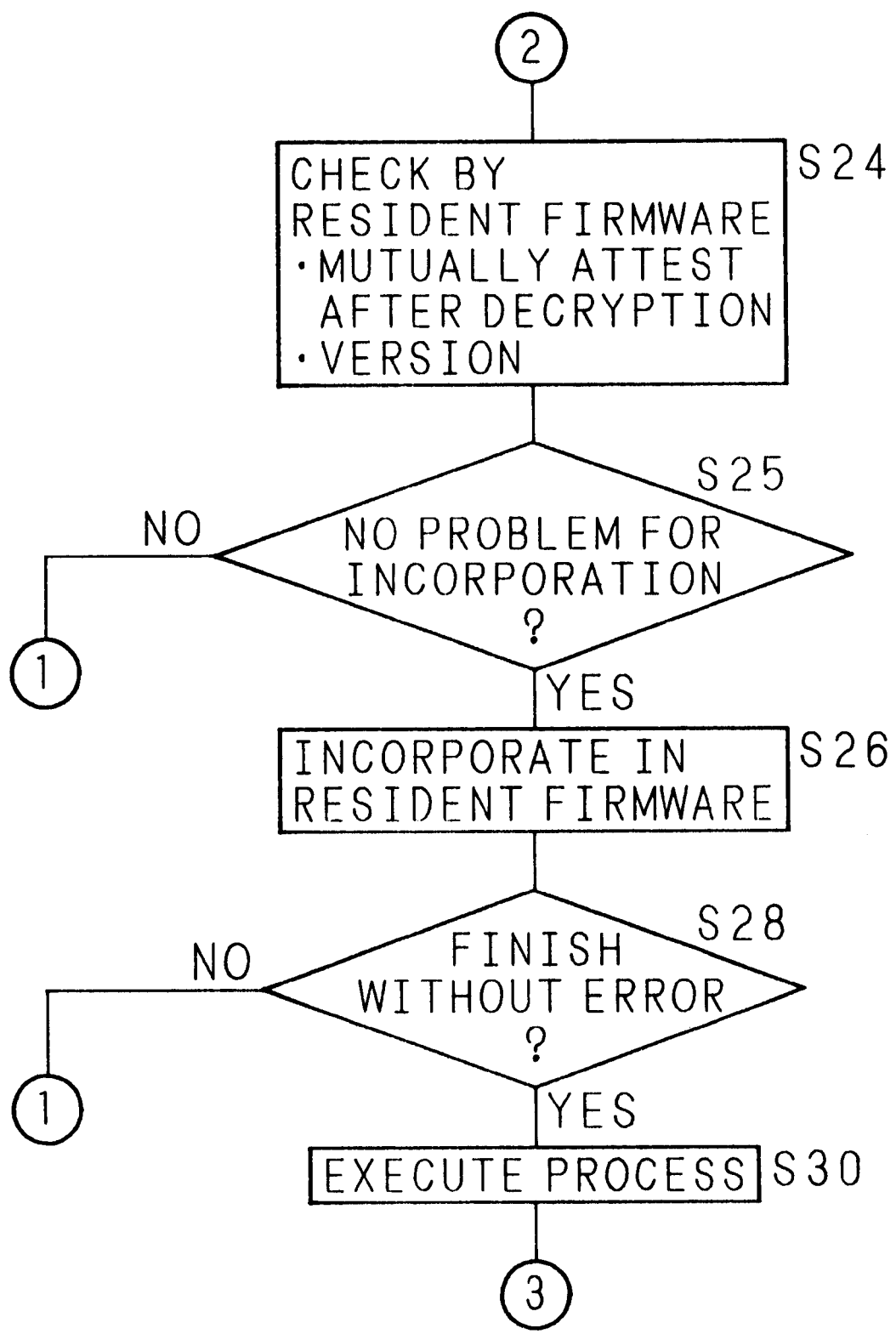
FIG. 4 is a flowchart showing an operation of the MO driving device.

FIG. 2 is a flowchart showing an operation of the personal computer 5 for controlling the MO driving device 2 constructed as mentioned, and FIG. 3, FIG. 4 are flowcharts showing an operation of the MO driving device 2. Now, with reference to the flowcharts according to FIG. 2, FIG. 3 and FIG. 4, the operations of the personal computer 5 and the MO driving device 2 will be explained.

The personal computer 5 judges upon input of a process request from the user 3 (FIG. 2, S10) whether the process is acceptable on the basis of the peripheral environment, and so on (S12), and if it is judged NO (not acceptable), error is displayed (S13).

If it is judged YES (acceptable), the personal computer 5 sends instructions to the MO driving device 2 (S14), executes process request 4, and the procedure is returned to S10.

By using the resident firmware 9, the processing unit 8 of the MO driving device 2 judges upon receipt of instructions of process request 4 from the personal computer 5 (S15) whether the firmware for executing the process is within the MO driving device 2 and is incorporated in the resident firmware 9 (S16). If it is judged YES (the firmware for executing the process is incorporated in resident firmware 9), the process is executed (S18), and the procedure is returned to S15.

By using the resident firmware 9, if the processing unit 8 judges that the firmware for executing the process is not incorporated in the resident firmware 9, the MO medium 1 set in the MO driving device 2 is driven for executing a search 12 (FIG. 1) within the MO medium 1 in order to obtain a firmware for process execution (S20), and if no firmware for process execution is found, an instruction is sent as to set another MO medium which stores the firmware for process execution (S32). If no resetting to another MO medium storing the firmware for execution is performed (S34), error is displayed on the personal computer 5 (S36).

By using the resident firmware 9, if resetting to another MO medium storing the firmware for execution is performed (S34), the processing unit 8 drives the reset MO medium 1 to execute a search 12 for a firmware for process execution within the MO medium 1 (S20). If a firmware 6 for process execution is found, a signature information, which is an encrypted information for judging whether firmware 6 has been tampered, is first read in and checked (S21), and if it is judged YES (firmware 6 has been tampered with) (S22), error is displayed on the personal computer 5 (S36).

If the firmware 6 has not been tampered with, and it is judged that there are no problems for reading-in (S22), reading-in 15 of the media ID symbol 7 which is information peculiar to the MO medium I is executed, and by using this media ID symbol 7, reading-in (S23) and decryption 13 (S24) of the firmware 6 is executed. The decrypted firmware 6 and the resident firmware 9 are mutually attested, and as a result, it is judged whether the resident firmware 9 and firmware 6 can be interlocked with each other, or whether the resident firmware 9 and firmware 6 can be interlocked with each other when satisfying specified conditions such as that there are no incorrect programs added to firmware 6, and the resident firmware 9 compares the firmware 6 with already incorporated firmware (S24).

By using the resident firmware 9, if the processing unit 8 judges that the decrypted firmware 6 can not be interlocked with the resident firmware 9 (S25), error is displayed on the personal computer 5 (S36).

If the processing unit 8 judges by using the resident firmware 9 that the already incorporated firmware is equal to the firmware 6 (if their versions are equal) (S24), incorporation of firmware 6 (S26) is not executed.

If the processing unit 8 judges by using the resident firmware 9 that the decrypted firmware 6 can be interlocked with the resident firmware 9 (S25), the decrypted firmware 6 is incorporated into the resident firmware 9 within the resident firmware area 10 from the loading firmware area 11 (S26). If this incorporation is completed without any errors (S28), an operating environment of the MO driving device 2 for executing process request 4 is prepared.

Thus, by interlocking the resident firmware 9 and the firmware 6, and by using the contents kept in areas other than those of firmware A, B, C of the MO medium 1, the MO driving device 2 executes the requested process (S30), and the procedure is returned to S15.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A resident control program for decoding encrypted data stored on a storage medium, the resident control program being stored on the storage medium along with the encrypted data, and being executed within the driving device, the resident control program comprising:

a first program code means for enabling the driving device to judge, upon receipt of an external instruction, whether the resident control program incorporates an executing control program;

a second program code means for enabling the driving device to search the storage medium for the executing control program if said first program code means judges that the resident control program does not include the executing control program;

a third program code means for enabling the driving device to read the searched executing control program; and a fourth program code means for enabling the driving device to decode the read executing control program; and a fifth program code means for enabling the driving device to incorporate the decoded executing control program into the resident control program.

2. The storage medium driving device of claim 1, wherein said resident control program further includes a sixth program code means for making the storage medium driving device read in information peculiar to each storage medium from said storage medium, wherein the storage medium driving device decrypts the read executing control program by using said peculiar information.

3. The storage medium driving device of claim 2, wherein said resident control program further includes a program code means for prohibiting the storage medium driving device from reading in said peculiar information by any other program code means but said resident control program.

4. A storage medium driven by the storage medium driving device according to claim 2, which stores peculiar information therein.

5. The storage medium driving device of claim 1, wherein said resident control program further includes a sixth program code means for making said storage medium driving device interlock the incorporated executing control program with the resident control program.

6. The storage medium driving device of claim 5, wherein said resident control program further includes:

a seventh program code means for making the storage medium driving device judge whether it can be interlocked with the read executing control program or not; and an eight program code means for making the storage medium driving device incorporate the read executing control program therein when it is judged that they can be interlocked with each other.

7. The storage medium driving device of claim 5, wherein said resident control program further includes:

a seventh program code means for making the storage medium driving device judge whether the incorporated executing control program and the read executing control program are equal or not; and an eight program code means for preventing the storage medium driving device from incorporating the read executing control program therein when it is judged that the control programs are equal.

8. The storage medium driving device of claim 1, wherein said resident control program further includes a sixth program code means for prohibiting the storage medium driving device from reading in said control program from said storage medium by any other program code means than said sixth program code means for reading-in.

9. The storage medium driving device of claim 1, wherein said resident control program further includes:

a sixth program code means for making the storage medium driving device read in the encrypted data kept in said searched control program;

a seventh program code means for making the storage medium driving device judge on the basis of the read-in encrypted information whether said control program is tampered with or not; and an eight program code means for making the storage medium driving device read in said control program when it is judged that it is not tampered with.

10. A storage medium driven by the storage medium driving device according to claim 9, which keeps, in the stored control program of said storage medium driving device, encrypted information for judging whether the control program is tampered with or not.

11. A data protecting method for protecting encrypted record information stored in a detachable storage medium by means of a control program executed within a storage medium driving device, said data protecting method comprising the steps of:

judging, only on the basis of an external instruction from an upper device for executing a specified process, whether a resident control program within the driving device includes an executing control program for decrypting data stored on the storage medium;

searching the storage medium for the executing control program if said judging step determines that the resident control program does not include the executing control program;

reading the searched executing control program;

decrypting the read control program; and incorporating the decrypted control program into the resident control program stored in the storage medium driving device.

12. The data protecting method of claim 11, wherein said resident control program reads in information peculiar to each storage medium from said storage medium, and decrypts the executing control program by using said read-in peculiar information.

13. The data protecting method of claim 12, wherein only said resident control program is allowed to read in said peculiar information.

14. The data protecting method of claim 11, wherein said resident control program interlocks the incorporated executing control program.

15. The data protecting method of claim 14, wherein said resident control program judges whether it can be interlocked with the read executing control program or not, and incorporates the read executing control program when it is judged that the control programs can be interlocked with each other.

16. The data protecting method of claim 15, wherein said resident control program judges whether the already incorporated executing control program and another read executing control program are equal or not, and does not incorporate the read executing control program therein when it is judged that they are equal.

17. The data protecting method of claim 11, wherein only said resident control program is allowed to read in said control program from said storage medium.

18. The data protecting method of claim 11, wherein said resident control means reads in the encrypted information kept in the executing control program;

judges on the basis of the read-in encrypted information whether the executing control program is tampered with or not; and reads in the executing control program when it is judged that it is not tampered with.

* * * * *

UNITED STATES PATENT AND TRADEMARK OFFICE
CERTIFICATE OF CORRECTION

PATENT NO. : 6,173,390 B1
DATED : January 9, 2001
INVENTOR(S) : Kctani et al.

It is certified that error appears in the above-identified patent and that said Letters Patent is hereby corrected as shown below:

Column 6,
Line 24, delete "eight" and insert -- eighth -- therefor.
Line 34, delete first occurrence of "a" and insert -- an executing -- therefor.
Line 47, delete "control" and insert -- executing -- therefor.
Line 48, after "encrypted", insert -- executing --.

Column 7,
Line 9, before "control", insert -- executing --.

Signed and Sealed this

Twenty-fifth Day of June, 2002

Attest:

Attesting Officer

JAMES E. ROGAN
Director of the United States Patent and Trademark Office